United States Patent
Namgung et al.

(10) Patent No.: US 12,111,206 B2
(45) Date of Patent: Oct. 8, 2024

(54) VISION SENSOR INCLUDING A VOLTAGE GENERATION CIRCUIT FOR OUTPUTTING A TEST BIAS VOLTAGE TO A TRANSISTOR AND OPERATING METHOD THEREOF

(71) Applicant: SAMSUNG ELECTRONICS CO., LTD., Suwon-si (KR)

(72) Inventors: Seol Namgung, Seoul (KR); Jeongseok Kim, Suwon-si (KR); Yunjae Suh, Suwon-si (KR); Junseok Kim, Hwaseong-si (KR); Jongwoo Bong, Seoul (KR); Seungnam Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 38 days.

(21) Appl. No.: 17/729,320

(22) Filed: Apr. 26, 2022

(65) Prior Publication Data
US 2022/0373389 A1   Nov. 24, 2022

(30) Foreign Application Priority Data
May 18, 2021   (KR) .................. 10-2021-0064212

(51) Int. Cl.
*G01J 1/44*   (2006.01)
*H04N 25/40*  (2023.01)
*H04N 25/76*  (2023.01)

(52) U.S. Cl.
CPC ............ *G01J 1/44* (2013.01); *H04N 25/40* (2023.01); *H04N 25/76* (2023.01)

(58) Field of Classification Search
CPC .......... G01J 1/44; H04N 25/76; H04N 25/40; H04N 17/002; H04N 25/70
See application file for complete search history.

(56) References Cited

U.S. PATENT DOCUMENTS

| | | | |
|---|---|---|---|
| 9,660,622 B2 | 5/2017 | Kim et al. | |
| 9,681,081 B2 | 6/2017 | Serrano Gotarredona et al. | |
| 9,875,390 B2 | 1/2018 | Lee et al. | |
| 10,075,704 B2 | 9/2018 | Hoekstra et al. | |
| 10,161,789 B2 | 12/2018 | Suh et al. | |
| 10,567,679 B2 | 2/2020 | Berner et al. | |
| 10,721,423 B2 | 7/2020 | Finateu et al. | |
| 2007/0046800 A1* | 3/2007 | Chen | H04N 25/573 |
| | | | 348/E3.019 |

(Continued)

FOREIGN PATENT DOCUMENTS

| | | |
|---|---|---|
| EP | 3780583 A1 | 2/2021 |
| KR | 10-2017-0027107 A | 3/2017 |

OTHER PUBLICATIONS

European Search Report issued Sep. 26, 2022 by the European Patent Office in EP Patent Application No. 22173891.7.

*Primary Examiner* — Jennifer D Bennett
(74) *Attorney, Agent, or Firm* — Sughrue Mion, PLLC

(57) ABSTRACT

A vision sensor and an operating method of the vision sensor are provided. The vision sensor includes a pixel array including a plurality of pixels arranged in a form of a matrix; and a bias voltage generation circuit configured to provide a test bias voltage to the pixel array, wherein each of the plurality of pixels includes a sensing circuit configured to sense light and generate a first output voltage, wherein the first output voltage changes as the test bias voltage changes within a specific frame.

17 Claims, 12 Drawing Sheets

(56) References Cited

U.S. PATENT DOCUMENTS

| | | | |
|---|---|---|---|
| 2007/0139729 A1* | 6/2007 | Lee | H04N 1/00031 |
| | | | 382/312 |
| 2017/0033777 A1 | 2/2017 | Kim et al. | |
| 2018/0143701 A1 | 5/2018 | Suh et al. | |
| 2020/0106972 A1* | 4/2020 | Matolin | H04N 25/40 |
| 2020/0236311 A1 | 7/2020 | Suh et al. | |
| 2020/0351455 A1 | 11/2020 | Niwa | |
| 2020/0410272 A1* | 12/2020 | Seo | G06F 18/243 |
| 2021/0058575 A1* | 2/2021 | Niwa | H01L 27/14612 |
| 2021/0306586 A1* | 9/2021 | Yamamoto | H04N 23/73 |

* cited by examiner

| VOUT1 | V1 | ... | Vn |
|---|---|---|---|
| CS1 | D11 | ... | D1n |
| CS2 | D21 | ... | D2n |

VISION SENSOR INCLUDING A VOLTAGE GENERATION CIRCUIT FOR OUTPUTTING A TEST BIAS VOLTAGE TO A TRANSISTOR AND OPERATING METHOD THEREOF

CROSS-REFERENCE TO RELATED APPLICATION

This application is based on and claims priority under 35 U.S.C. § 119 to Korean Patent Application No. 10-2021-0064212, filed on May 18, 2021, in the Korean Intellectual Property Office, the disclosure of which is incorporated by reference herein in its entirety.

BACKGROUND

The inventive concept relates to a vision sensor, and more particularly, to a vision sensor in which a bias voltage provided to a pixel is adjusted, and an operating method thereof.

A human-computer interaction (HCI) between a human and a computer is implemented and operates based on a user interface. Various user interfaces for recognizing a user input may provide a natural interaction between a human and a computer. Various sensors may be used for recognizing a user input.

When an event (for example, an intensity variation of light) occurs, a vision sensor (for example, a dynamic vision sensor) generates information about an event, e.g., event data, and transfers the event data to a processor. In order to test a characteristic of the vision sensor to detect a change in light, there is a problem that a separate lighting device is required.

SUMMARY

The inventive concept provides a vision sensor capable of testing a characteristic of the vision sensor detecting light without a separate lighting device, and an operating method thereof.

According to an embodiment, there is provided a vision sensor including: a pixel array including a plurality of pixels arranged in a form of a matrix; and a bias voltage generation circuit configured to provide a test bias voltage to the pixel array, wherein each of the plurality of pixels includes a sensing circuit configured to sense light and generate a first output voltage, and wherein the first output voltage changes as the test bias voltage changes within a specific frame.

According to an embodiment, there is provided a vision sensor including: a pixel including a sensing circuit configured to sense light and generate a first output voltage; a bias voltage generation circuit configured to provide a test bias voltage to the sensing circuit to change the first output voltage; and a bias control signal generation circuit configured to generate a bias control signal for changing the test bias voltage.

According to an embodiment, there is provided an operating method of a vision sensor including a plurality of pixels, each of the plurality of pixels including a sensing circuit configured to sense light. The method includes: providing a test bias voltage to the sensing circuit so that an output voltage of the sensing circuit has a first level within one frame; providing the test bias voltage to the sensing circuit so that the output voltage of the sensing circuit has a second level that is different from the first level within the one frame; and generating event data according to a change from the first level to the second level of the output voltage, wherein the test bias voltage to output the output voltage of the first level and the second level are provided to each of a plurality of frames, and the event data is generated for each of the plurality of frames.

BRIEF DESCRIPTION OF THE DRAWINGS

Embodiments of the inventive concept will be more clearly understood from the following detailed description taken in conjunction with the accompanying drawings in which.

DETAILED DESCRIPTION

Hereinafter, various embodiments of the inventive concept are described in connection with the accompanying drawings.

Figure 1:
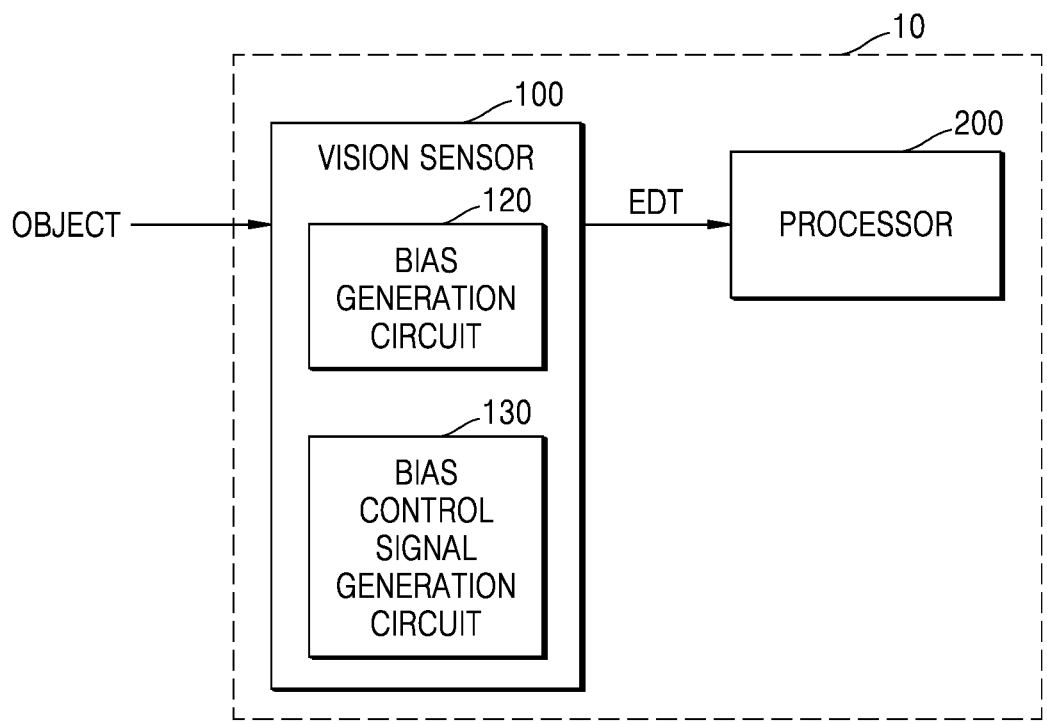
FIG. 1 is a block diagram illustrating an electronic device according to an embodiment.

FIG. 1 is a block diagram illustrating an electronic device 10 according to an embodiment.

The electronic device 10 according to an embodiment may be an image processing device having an image or light sensing function. For example, the electronic device 10 may be equipped in electronic devices such as cameras, smartphones, wearable devices, Internet of things (IoT) devices, tablet personal computers (PCs), personal digital assistants (PDAs), portable multimedia players (PMPs), navigation devices, drones, and advanced drivers assistance systems (ADASs). Also, the electronic device 10 may be provided as a component in vehicles, furniture, manufacturing equipment, doors, various measurement devices, etc.

Referring to FIG. 1, the electronic device 10 may include a vision sensor 100 and a processor 200.

The vision sensor 100 may sense an intensity variation of incident light and output event data EDT. The vision sensor 100 may be a dynamic vision sensor that outputs the event data EDT according to pixels (e.g., pixels PX in FIG. 2) by which the intensity variation of light is sensed. The variation in intensity of light may occur be due to the movement of an object photographed by the vision sensor 100, the movement of the vision sensor 100 or the electronic device 10, or a change in light intensity of an external lighting device of the vision sensor 100. The vision sensor 100 may periodically or aperiodically transmit the event data EDT to the processor 200. The vision sensor 100 may transmit the event data EDT to the processor 200 in units of packets or frames.

The vision sensor 100 may selectively transmit the event data EDT to the processor 200. The vision sensor 100 may transmit, to the processor 200, the event data EDT according to signals generated from the pixels PX corresponding to a region of interest set on a pixel array (e.g., 110 of FIG. 2) among signals generated entirely from the pixel array 110.

In an embodiment, the vision sensor 100 may include a bias generation circuit 120 that provides a test bias voltage to the pixel array 110, and a bias control signal generation circuit 130 that generates a bias control signal for changing the magnitude of the test bias voltage. The vision sensor 100 may adjust the magnitude of the test bias voltage provided to each of the pixels PX, and may output the event data EDT that varies according to the magnitude of the test bias voltage.

The processor 200 may process the event data EDT received from the vision sensor 100 and may detect the movement of an object (or the movement of an object based on an image recognized by the electronic device 10). The processor 200 may include an application specific integrated circuit (ASIC), a field-programmable gate array (FPGA), a dedicated microprocessor, a microprocessor, and a general purpose processor. In an embodiment, the processor 200 may include an application processor or an image signal processor.

Each of the vision sensor 100 and the processor 200 may be implemented as an integrated circuit (IC). For example, each of the vision sensor 100 and the processor 200 may be implemented as separate semiconductor chips. Alternatively or additionally, the vision sensor 100 and the processor 200 may be implemented as a single chip. For example, the vision sensor 100 and the processor 200 may be implemented as a system on chip (SoC).

The electronic device 10 may be a test device for testing a characteristic of the vision sensor 100. The processor 200 may collect the event data EDT output from the vision sensor 100 for each of a plurality of frames, and determine a pixel characteristic of the vision sensor 100. For example, the processor 200 may determine a characteristic of detecting a change in light of each of the pixels PX included in the pixel array 110 by collecting the event data EDT generated as the magnitude of the test bias voltage provided to the pixel PX changes. The test bias voltage may be provided to the pixel PX within a specific time between a time when the pixel PX is reset and a hold time when an on/off signal is held. Alternatively or additionally, the processor 200 may determine the characteristic of detecting the change in light of each of the pixels PX included in the pixel array 110 by collecting the event data EDT generated as the magnitude of the test bias voltage provided to the pixel PX changes during the time between the time when the pixel PX is reset and the hold time when the on/off signal is held.

The vision sensor 100 according to the inventive concept may apply the test bias voltage to the pixel array 110 so that the intensity of light detected by the pixel array 110 may stay constant even when the intensity of external light substantially changes. Therefore, when performing a test operation of testing the characteristic of the vision sensor 100 of detecting the change in light, the test device may test the characteristic of the vision sensor 100 by changing the magnitude of the test bias voltage without a separate lighting device for providing light to the vision sensor 100.

Figure 2:
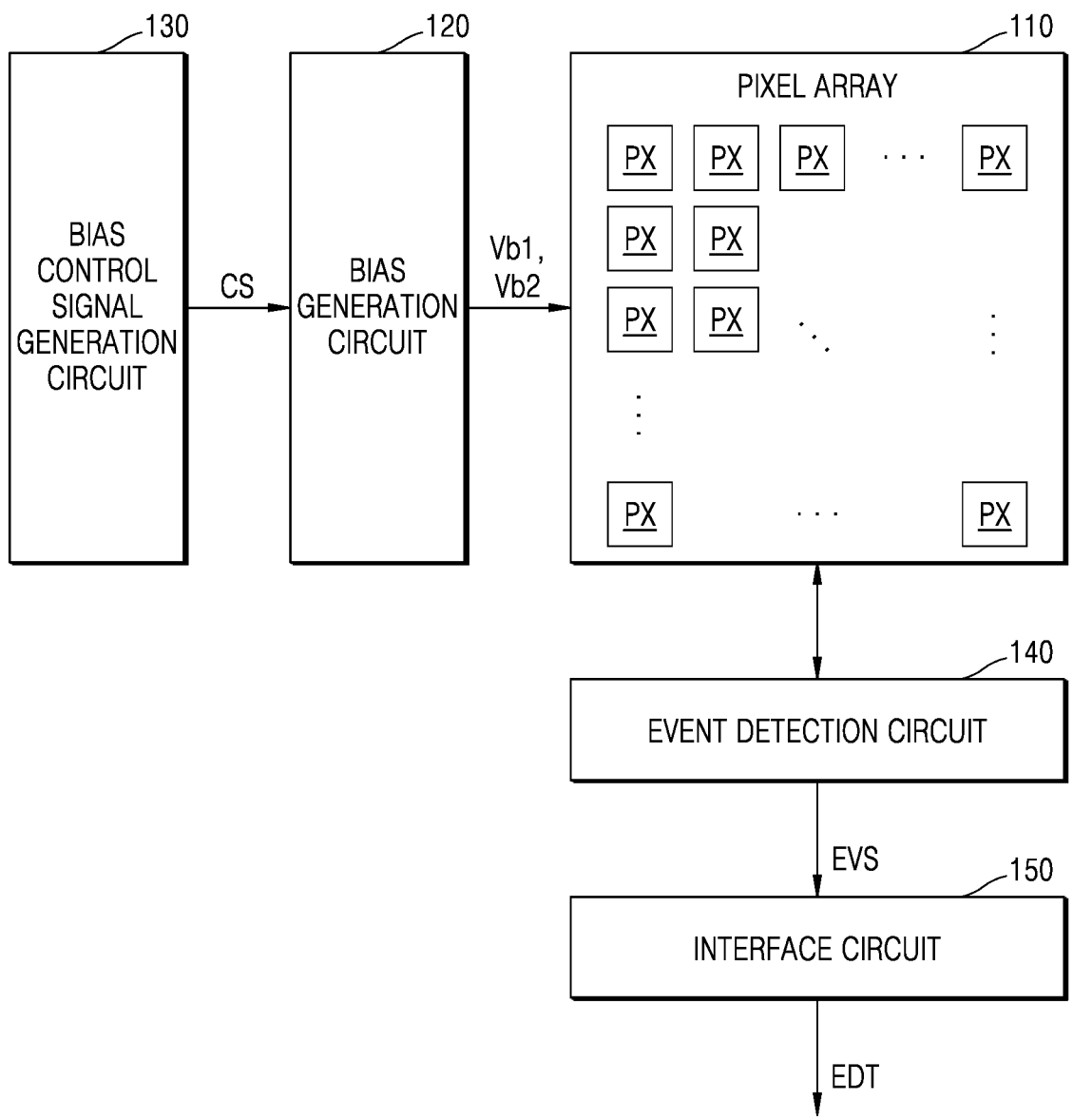
FIG. 2 is a block diagram illustrating a vision sensor according to an embodiment.

FIG. 2 is a block diagram illustrating the vision sensor 100 according to an embodiment.

Referring to FIG. 2, the vision sensor 100 may include the pixel array 110, the bias generation circuit 120, the bias control signal generation circuit 130, an event detection circuit 140, and an interface circuit 150.

The pixel array 110 may include a plurality of pixels PX arranged in the form of a matrix. Each of the plurality of pixels PX may detect events in which the intensity of received light increases or decreases. For example, each of the plurality of pixels PX may be connected to the event detection circuit 140 through a column line extending in a column direction and a row line extending in a row direction. A signal including information about whether an event has occurred and polarity information of the event (e.g., an on-event in which the intensity of light increases and/or an off-event in which the intensity of light decreases) from the pixel PX may be output to the event detection circuit 140.

The bias generation circuit 120 may generate voltages to be provided to the pixel array 110. For example, the bias generation circuit 120 may generate threshold voltages to detect the on-event and the off-event from the pixel PX, and the bias generation circuit 120 may generate test bias voltages Vb1 and Vb2.

The bias generation circuit 120 may change a voltage level of at least one of a first test bias voltage Vb1 and a second test bias voltage Vb2 (hereinafter "the first and second test bias voltages Vb1 and Vb2") according to the control of the bias control signal generation circuit 130. The first and second test bias voltages Vb1 and Vb2 may be provided to a sensing circuit (e.g., 111 of FIG. 3) of the pixel PX, and an output voltage output from the sensing circuit 111 may be adjusted according to changes in the first and second test bias voltages Vb1 and Vb2. In an embodiment, an output voltage output from the sensing circuit 111 may be adjusted by adjusting an output of a current-voltage conversion circuit included in the sensing circuit 111 of the pixel PX according to the magnitude of the first test bias voltage Vb1. In addition, in an embodiment, the output voltage output from the sensing circuit 111 may be adjusted by adjusting the magnitude of current from a current source of a source-follower buffer included in the sensing circuit 111 according to the magnitude of the second test bias voltage Vb2.

The bias control signal generation circuit 130 may generate a bias control signal CS for adjusting the voltage levels of the first and second test bias voltages Vb1 and Vb2 generated by the bias generation circuit 120. The bias control signal CS may be a control signal for adjusting the magnitude of the current generated by a variable current source included in the bias generation circuit 120.

The event detection circuit 140 may receive polarity information from the pixel array 110 and process events. The event detection circuit 140 may generate an event signal EVS including polarity information of an occurred event, an address of a pixel in which the event has occurred, and a time stamp. The event detection circuit 140 may process the events occurring in the pixel array 110 in units of a pixel PX, a subpixel array included in a pixel PX, a column, or a frame. For example, the event detection circuit 140 may process events occurring in a subpixel (e.g., red (R) subpixel, green (G) subpixel and blue (B) subpixel) of a pixel PX, or events occurring in a column including one or more pixels PX.

The event detection circuit 140 may include a row address event representation (AER), a column AER, and an event processing signal unit. The row AER may receive the polarity information indicating that the event has occurred (e.g., a signal indicating that the on-event or the off-event has occurred POL of FIG. 3) in a pixel PX, and generate a row address of the pixel PX where the event has occurred. The column AER may receive the polarity information POL indicating that the event has occurred in a pixel PX, and generate a column address of the pixel PX where the event has occurred.

The event detection unit 140 may generate the event signal EVS based on the row address and the column address respectively received from the row AER and the column AER, the polarity information POL generated in the pixel PX, and a time stamp (e.g., information about the time when the event has occurred). The event detection unit 140 may remove a noise event and generate the event signal EVS with respect to valid events. For example, when an amount of events generated for a certain period of time is less than a set threshold, the event processing signal unit may determine the events as noise, and may not generate the event signal EVS with respect to the determined noise events.

The interface circuit 150 may receive the event signals EVS and transmit the event data EDT to the processor (e.g., 200 of FIG. 1) according to a set protocol. The interface circuit 150 may pack the event signals EVS in an individual signal unit, a packet unit, or a frame unit according to the set protocol, generate the event data EDT, and transmit the event data EDT to the processor 200. For example, the interface circuit 150 may include one of an AER interface, a mobile industry processor interface (MIPI) interface, and a parallel interface.

Figure 3:
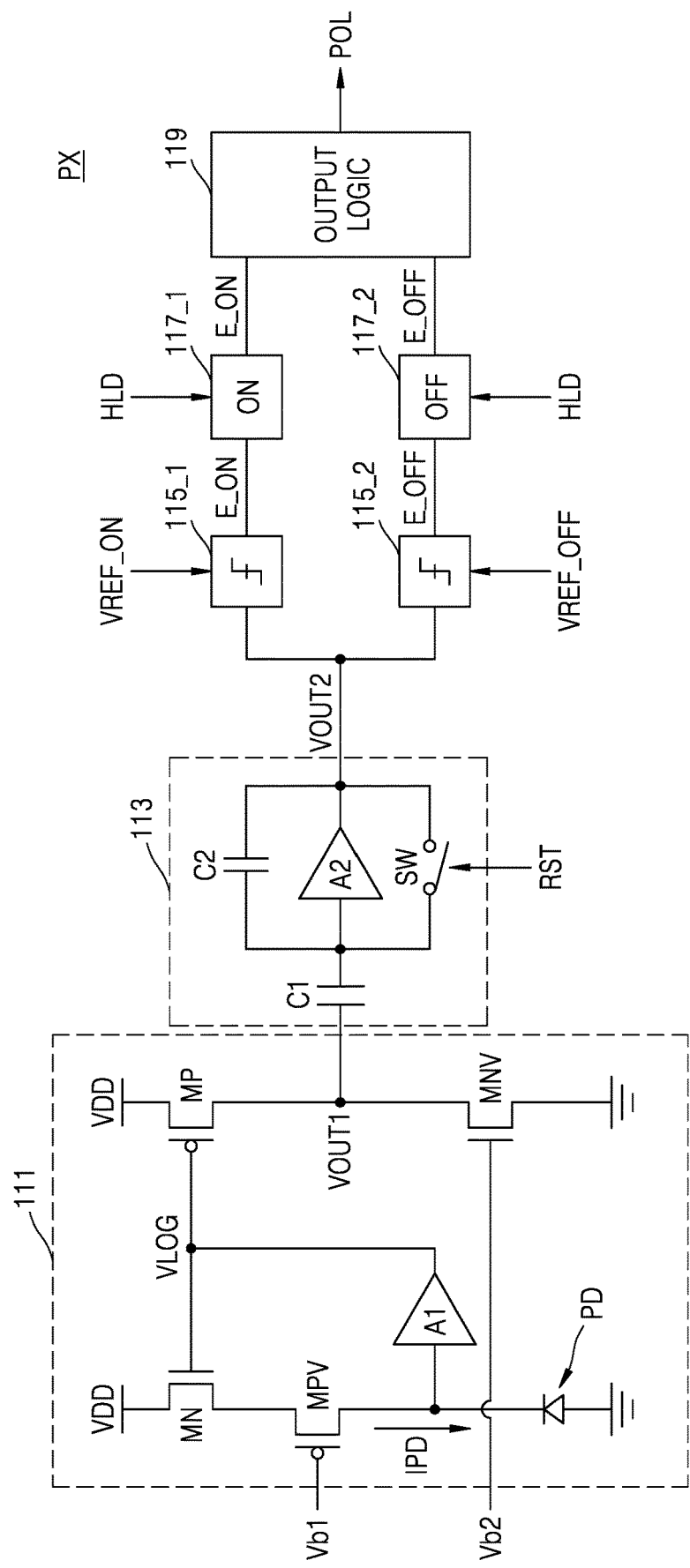
FIG. 3 is a circuit diagram illustrating an example of a pixel of a vision sensor according to an embodiment.

FIG. 3 is a circuit diagram illustrating an example of the pixel PX of a vision sensor according to an embodiment.

Referring to FIG. 3, the pixel PX may include the sensing circuit 111, a time variant circuit 113, comparison circuits 115_1 and 115_2, holder circuits 117_1 and 117_2, and an output logic circuit 119.

The sensing circuit 111 may sense light, and generate a first output voltage VOUT1 according to a result of sensing light. The sensing circuit 111 may include a photoelectric conversion element PD, a current-voltage conversion circuit, and a source follower circuit.

The photoelectric conversion element PD may generate a photocurrent IPD according to the intensity of light. The photoelectric conversion element PD may convert incident light, that is, an optical signal, into an electrical signal, for example, the photocurrent IPD. The photoelectric conversion element PD may include, for example, a photodiode, a phototransistor, a port gate, or a pinned photodiode, etc. The photoelectric conversion element PD may generate an electrical signal having a higher intensity as the intensity of incident light received by the photoelectric conversion element PD increases.

The current-voltage conversion circuit may convert the photocurrent IPD into a voltage VLOG, and may include a first amplifier A1, a first bias transistor MPV and an n-type transistor MN connected to the photoelectric conversion element PD. While an example of the current-voltage conversion circuit is provided in FIG. 3, the one or more embodiments are not limited thereto, and the current-voltage conversion circuit may be configured differently from that shown in FIG. 3.

The photocurrent IPD may flow through the first bias transistor MPV and the n-type transistor MN connected to the photoelectric conversion element PD. The n-type transistor MN may be an n-type metal-oxide-semiconductor (NMOS) transistor having one end to which a power voltage VDD is applied. The first bias transistor MPV may be a p-type metal-oxide-semiconductor (PMOS) transistor, and may have a gate terminal to which the first test bias voltage Vb1 may be applied.

The photocurrent IPD may not be linearly proportional to the intensity of sensed light. The first amplifier A1 may amplify the photocurrent IPD in a log scale so that the voltage VLOG is linearly proportional to the intensity of sensed light to generate the voltage VLOG. For example, the first amplifier A1 may be a log transimpedance amplifier. An output terminal of the first amplifier A1 may be connected to a gate terminal of the n-type transistor MN.

The source follower circuit may include a second bias transistor MNV and a p-type transistor MP. The source follower circuit may receive the voltage VLOG output from the first amplifier A1 and output the output voltage VOUT1. The source follower circuit may be regarded as a configuration included in the current-voltage conversion circuit that converts the photocurrent IPD into the output voltage VOUT1.

The p-type transistor MP is a PMOS transistor having one end to which the power voltage VDD is applied, and the other end connected to the second bias transistor MNV. The second bias transistor MNV is an NMOS transistor having a gate terminal to which the second test bias voltage Vb2 is applied, and having one end connected to a ground voltage and the other end connected to the other end of the p-type transistor MP. The output voltage VOUT1 may be output at the juncture (or node) of the other end of the p-type transistor MP and the other end of the second bias transistor MNV.

Even when the magnitude of the photocurrent IPD does not change due to no change in the brightness of light, when the magnitude of the first test bias voltage Vb1 provided to the current-voltage conversion circuit is changed, the voltage VLOG output from the first amplifier A1 may be changed in order to maintain a constant source-gate voltage of the first bias transistor MPV and a constant gate-source voltage of the n-type transistor MN. That is, when the magnitude of the first test bias voltage Vb1 is changed without a change in the brightness of the light, the output voltage VOUT1 of the sensing circuit 111 may change.

In addition, even when the magnitude of the photocurrent IPD does not change due to no change in the brightness of light, when the magnitude of the second test bias voltage Vb2 provided to the source follower circuit is changed, the magnitude of the current flowing through the source follower circuit may change and the magnitude of the output voltage VOUT1 may vary. Accordingly, the vision sensor according to the inventive concept may change the output voltage VOUT1 of the sensing circuit 111 to a desired level by changing at least one of the first test bias voltage Vb1 and the second test bias voltage Vb2, and may test the characteristic of the vision sensor by changing the output voltage VOUT1 to a desired level within one frame, without a separate lighting device for testing a characteristic for sensing a change in light.

The time variant circuit 113 may generate an output voltage VOUT2 according to an amount of variation of the output voltage VOUT1 of the sensing circuit 111 based on the output voltage VOUT1 of the sensing circuit 111. The time variant circuit 113 may include a first capacitor C1, a second amplifier A2, a second capacitor C2, and a reset switch SW.

The first capacitor C1 may be connected in series with the second amplifier A2. The first capacitor C1 may be charged according to a change in the output voltage VOUT1 generated by the sensing circuit 111. The second amplifier A2 may amplify a voltage generated due to the charge in the first capacitor C1 at a predetermined ratio. An amplification rate of the second amplifier A2 may be determined according to a ratio of the capacitance of the first capacitor C1 to the capacitance of the second capacitor C2. The second capacitor C2 may be a feedback capacitor.

The reset switch SW may be connected between an input terminal and an output terminal of the second amplifier A2. The reset switch SW may be turned on or off in response to a reset signal RST, and may reset the output voltage VOUT2 by connecting the input terminal to the output terminal of the second amplifier A2 so that voltages at both ends of the second amplifier A2 may be the same. In an embodiment, the reset switch SW may be a PMOS transistor, but is not limited thereto, and the reset switch SW may be implemented in various ways. The reset signal RST may be a global reset signal for simultaneously resetting the pixels PX included in the pixel array (e.g., 110 of FIG. 2), or a signal for individually resetting the pixels PX.

The first capacitor C1 may be reset based on the output voltage VOUT1 of the sensing circuit 111 during a reset operation. For example, during the reset operation, the input terminal and the output terminal of the second amplifier A2 may be shorted by the reset switch SW, the output voltage VOUT1 of the sensing circuit 111 may be applied to one end of the first capacitor C1, and the output voltage VOUT2 of the time variant circuit 113 may be applied to the other end of the first capacitor C1. The first capacitor C1 may store a voltage corresponding to a potential difference between both ends thereof.

The comparison circuits 115_1 and 115_2 may include a first comparison circuit 115_1 and a second comparison circuit 115_2. The first comparison circuit 115_1 may compare the output voltage VOUT2 with an on-threshold voltage VREF_ON and generate an on-signal E_ON according to a result of comparison. The second comparison circuit 115_2 may compare the output voltage VOUT2 with an off-threshold voltage VREF_OFF, and generate an off-signal E_OFF according to the result of comparison. The first comparison circuit 115_1 and the second comparison circuit 115_2 may generate the on-signal E_ON or the off-signal E_OFF when the amount of variation in the output voltage VOUT2 according to the change in light received by the photoelectric conversion element PD is equal to or greater than a certain reference, or the amount of variation of the output voltage VOUT2 according to changes of the first and second test bias voltages Vb1 and Vb2 applied to the sensing circuit 111 is equal to or greater than the certain reference. For example, the on-signal E_ON may have a high level when an amount of light received by the photoelectric conversion element PD increases more than a certain level, and the off-signal E_OFF may have a high level when the amount of light received by the photoelectric conversion element PD decreases more than the certain level.

The holder circuits 117_1 and 117_2 may include an on-event holder 117_1 and an off-event holder 117_2. The on-event holder 117_1 and the off-event holder 117_2 may respectively hold the on-signal E_ON and the off-signal E_OFF in response to a hold signal HLD and then respectively output the on-signal E_ON and the off-signal E_OFF.

The output logic circuit 119 may receive the on-signal E_ON and the off-signal E_OFF, and generate and output the polarity information POL based on the on-signal E_ON and the off-signal E_OFF. After outputting the polarity information POL, the output logic circuit 119 may provide the reset signal RST to the reset switch SW. Alternatively, after receiving the polarity information POL, the event detection circuit (e.g., 140 of FIG. 2) may provide the reset signal RST to the pixel PX where the event has occurred based on the polarity information POL.

Figure 4:
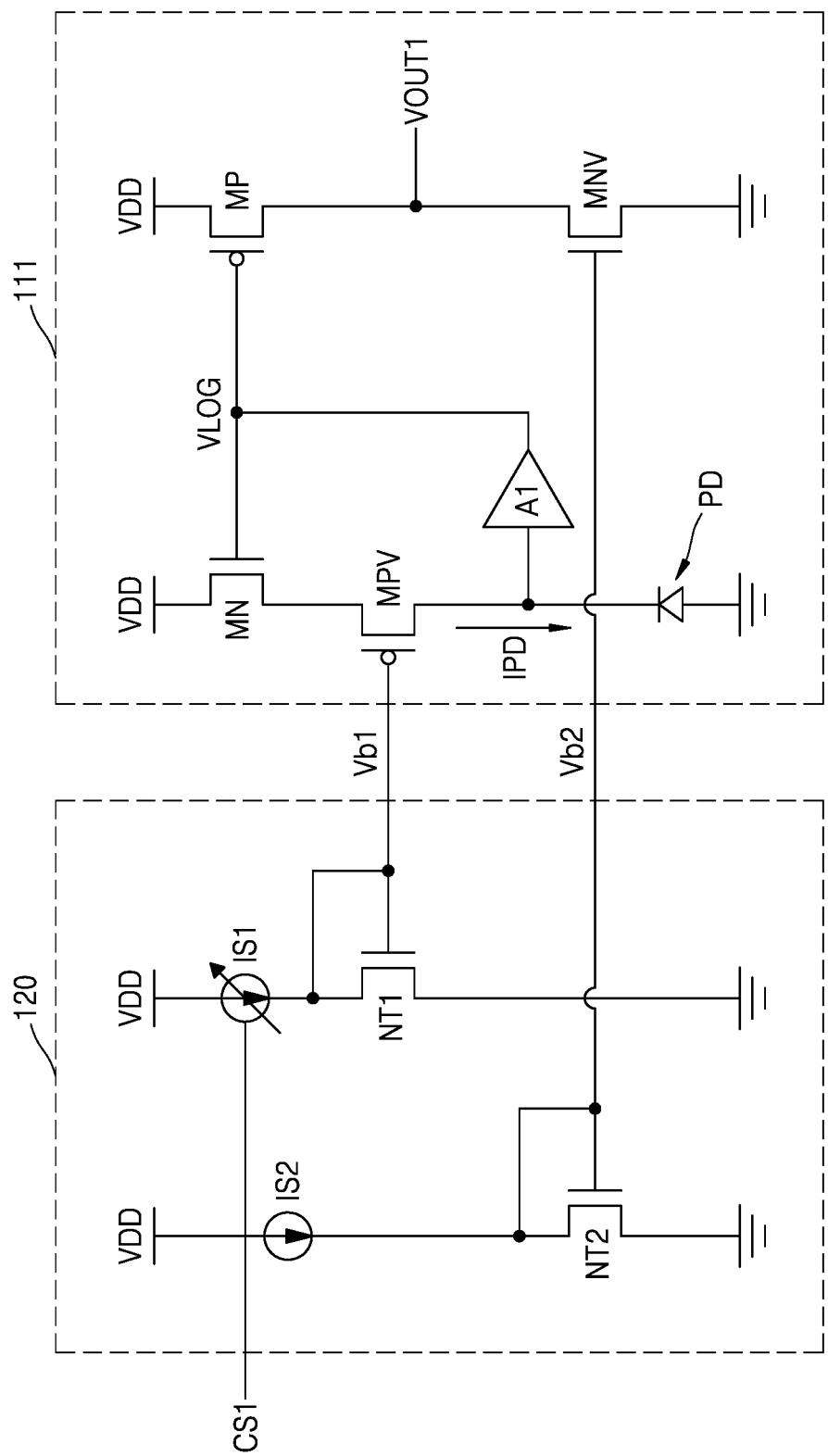
FIGS. 4 and 5 are circuit diagrams illustrating examples of a bias generation circuit of a vision sensor according to an embodiment.
Figure 5:
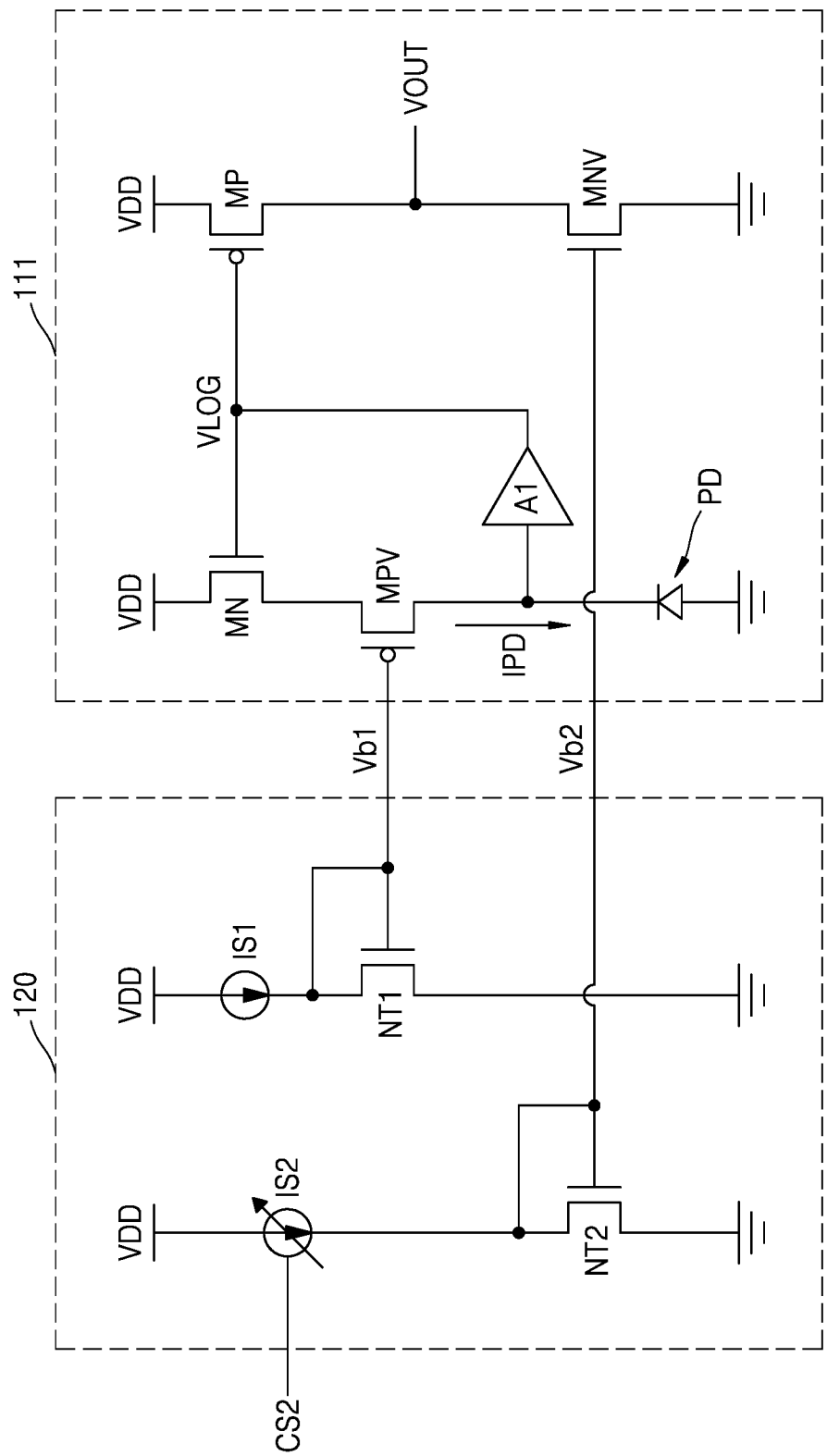

FIGS. 4 and 5 are circuit diagrams illustrating examples of the bias generation circuit 120 of a vision sensor according to an embodiment. In FIGS. 4 and 5, redundant descriptions of the same reference numerals as in FIG. 3 will be omitted.

Referring to FIGS. 4 and 5, the bias generation circuit 120 may generate the first test bias voltage Vb1 applied to a gate terminal of the first bias transistor MPV of a current-voltage conversion circuit of the sensing circuit 111. The bias generation circuit 120 may include a first current source IS1 and a first transistor NT1. The first transistor NT1 may be an n-type transistor and may generate the first test bias voltage Vb1 according to a current generated by the first current source IS1.

The bias generation circuit 120 may generate the second test bias voltage Vb2 applied to a gate terminal of the second bias transistor MNV of a source follower circuit of the sensing circuit 111. The bias generation circuit 120 may include a second current source IS2 and a second transistor NT2. For example, the second transistor NT2 may be an n-type transistor and may generate the second test bias voltage Vb2 according to a current generated by the second current source IS2.

In an embodiment, at least one of the first current source IS1 or the second current source IS2 may be a variable current source. For example, the first current source IS1 may be a variable current source, the magnitude of current generated in the first current source IS1 may vary according to a first bias control signal CS1, and the magnitude of the first test bias voltage Vb1 may also vary. Alternatively or additionally, for example, the second current source IS2 may be a variable current source, the magnitude of current generated in the second current source IS2 may vary according to a second bias control signal CS2, and the magnitude of the second test bias voltage Vb2 may also vary. The first bias control signal CS1 and the second bias control signal CS2 may be included in the bias control signal CS generated by the bias control signal generation circuit 130 of FIG. 2.

Figure 6:
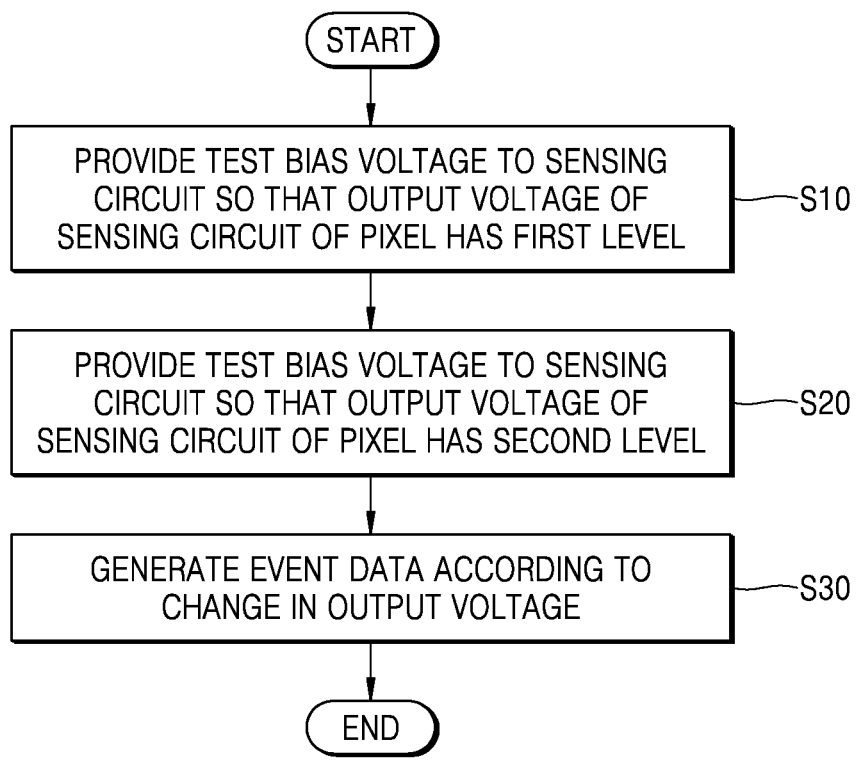
FIG. 6 is a flowchart illustrating an operating method of a vision sensor according to an embodiment.

FIG. 6 is a flowchart illustrating an operating method of a vision sensor according to an embodiment.

The operating method of the vision sensor described with reference to FIG. 6 relates to an operation of obtaining a pixel characteristic of the vision sensor, includes operations performed within one frame, and signals described with reference to FIG. 6 are signals within one frame.

Referring to FIGS. 3 and 6, in operation S10, a test bias voltage may be provided to the sensing circuit 111 so that the output voltage VOUT1 of the sensing circuit 111 of the pixel PX is at a first level. In this regard, the test bias voltage may mean at least one of the first test bias voltage Vb1 provided to a current-voltage conversion circuit of the sensing circuit 111 or the second test bias voltage Vb2 provided to a source follower circuit of the sensing circuit 111.

In operation S20, the test bias voltage may be provided to the sensing circuit 111 so that the output voltage VOUT1 of the sensing circuit 111 of the pixel PX is at a second level. In this regard, the test bias voltage may mean at least one of the first test bias voltage Vb1 or the second test bias voltage Vb2, and in operation S20, at least one of the first test bias voltage Vb1 or the second test bias voltage Vb2 may be changed.

In operation S30, event data (e.g., EDT of FIG. 2) according to a change in the output voltage VOUT1 may be generated. The operating method of the vision sensor described with reference to FIG. 6 is included in a method of testing a characteristic of the vision sensor and performs operations S10 to S30 in each of a plurality of frames, and thus characteristic information of the vision sensor may be obtained according to a result of collecting the event data output from the vision sensor.

Figure 7:
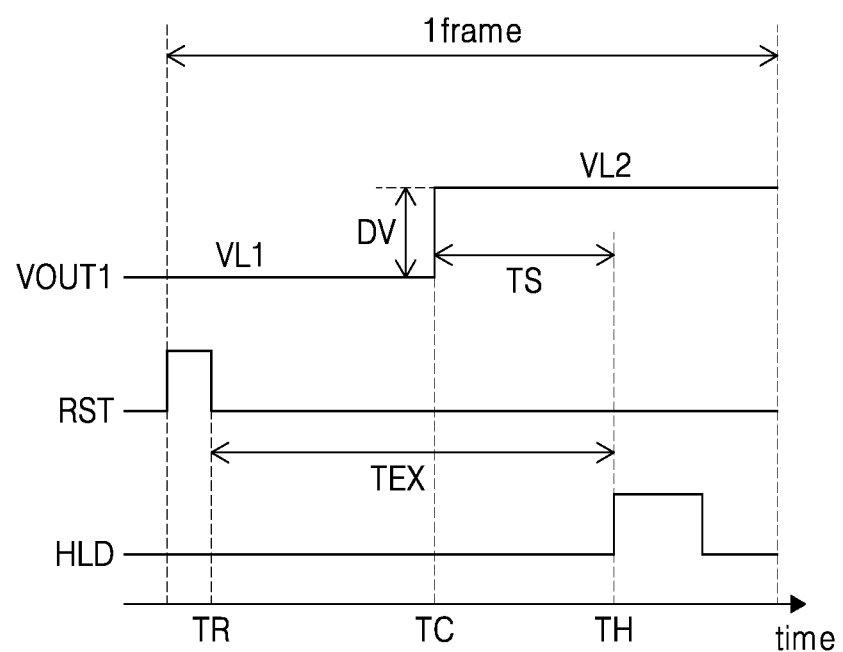
FIG. 7 is a timing diagram illustrating a signal provided to a pixel of a vision sensor and a signal generated from the pixel according to an embodiment.
Figure 8A:
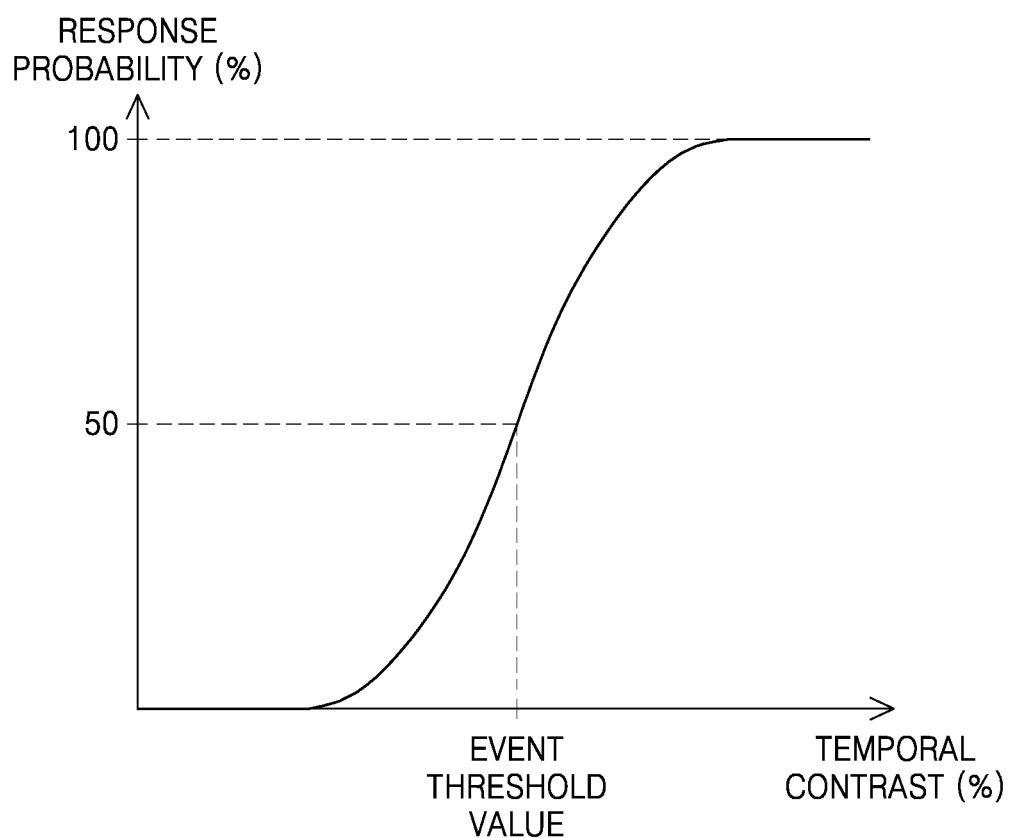
FIGS. 8A and 8B are graphs illustrating an operation of testing a characteristic of a vision sensor from event data output from the vision sensor according to an embodiment.
Figure 8B:
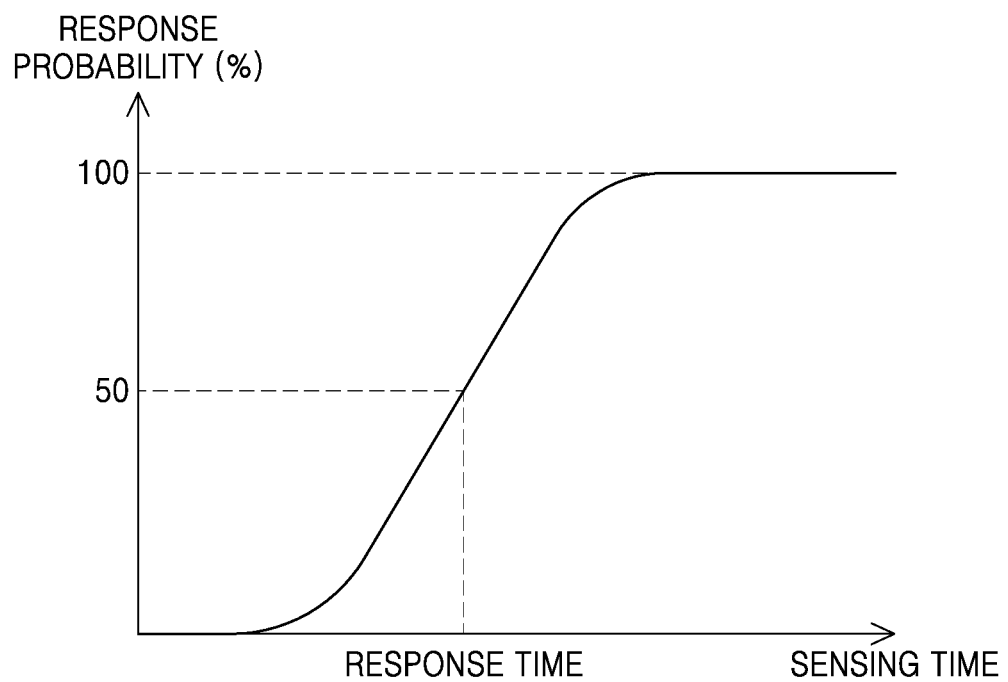

FIG. 7 is a timing diagram illustrating a signal provided to the pixel PX of a vision sensor and a signal generated from the pixel PX according to an embodiment. FIGS. 8A and 8B are graphs illustrating an operation of testing a characteristic of a vision sensor from event data output from the vision sensor according to an embodiment.

Referring to FIGS. 3 and 7, in response to the reset signal RST, the pixel PX may be reset, and one frame may be started. The output voltage VOUT1 of the sensing circuit 111 may be at a first level VL1 according to the first test bias voltage Vb1 and the second test bias voltage Vb2 provided to the sensing circuit 111 of the pixel PX.

At a level change time TC, at least one of the first test bias voltage Vb1 or the second test bias voltage Vb2 provided to the sensing circuit 111 may be changed, and the output voltage VOUT1 of the sensing circuit 111 may be changed from the first level VL1 to a second level VL2. The output voltage VOUT1 may be changed from the first level VL1 to the second level VL2 by an amount of variation DV.

In response to the hold signal HLD, the on-signal E_ON or the off-signal E_OFF according to a change in the output voltage VOUT1 may be output from the on-event holder circuit 117_1 or the off-event holder circuit 117_2. From a TR at which a reset operation is completed to a TH at which the hold signal HLD is received may be defined as an exposure time TEX within one frame.

Operations S10 to S30 of FIG. 6 may be performed in each of the plurality of frames. In an embodiment, in each of the plurality of frames, the amount of variation DV between the first level VL1 and the second level VL2 may be differently adjusted while maintaining a constant variation sensing time TS between a level change time TC and the time TH at which the hold signal HLD is received. As the amount of variation DV increases, it is highly likely that the on-signal E_ON or the off signal E_OFF is generated in a large number of pixels PX, whereas as the amount of variation DV decreases, it is highly likely that the on-signal E_ON or the off signal E_OFF is generated in a small number of pixels PX.

FIG. 8A is a diagram illustrating a response probability according to a change in a temporal contrast among characteristics of the vision sensor. The temporal contrast may mean a ratio of the amount of variation DV to the first level VL1 at the level change time TC, and the response probability may mean a ratio of the number of the pixels PX where an occurrence of an event is sensed among the number of the pixels PX included in a pixel array.

Referring to FIGS. 7 and 8A, the vision sensor according to the inventive concept may adjust the amount of variation DV with respect to the first level VL1 at the level change time TC by adjusting the magnitude of at least one of the first test bias voltage Vb1 or the second test bias voltage Vb2 in each of the plurality of frames, even without adjusting the brightness of an external lighting device, and obtain the event data EDT in each of the plurality of frames. Information on the light change sensing characteristic of the vision sensor may be obtained from the event data EDT of each of the plurality of frames. That is, a test device for testing the vision sensor may obtain information about the response probability according to the change in the temporal contrast using the event data EDT output from the vision sensor in each of the plurality of frames, and detect the characteristic of the vision sensor from the obtained information. For example, an event threshold value when the response probability is 50% may be obtained from the information, and the performance and reliability of the vision sensor may be determined using the detected event threshold value.

Referring back to FIG. 7, in an embodiment, in each of the plurality of frames, the change sensing time TS between the level change time TC and the time TH at which the hold signal HLD is received may be adjusted differently while the constant amount of variation DV between the first level VL1 and the second level VL2 is maintained. As the change sensing time TS increases, it is highly likely that the on-signal E_ON or the off signal E_OFF is generated in a large number of pixels PX, whereas as the change sensing time TS decreases, it is highly likely that the on-signal E_ON or the off signal E_OFF is generated in a small number of pixels PX.

FIG. 8B is a diagram illustrating a response probability according to a change in the change sensing time TS among the characteristics of the vision sensor. The change sensing time TS may mean a time between the level change time TC and the time TH at which the hold signal HLD is received, and the response probability may mean a ratio of the number of the pixels PX where an occurrence of an event is sensed among the number of the pixels PX included in the pixel array.

The vision sensor according to the inventive concept may adjust the change sensing time TS by adjusting a time at which the magnitude of at least one of the first test bias voltage Vb1 or the second test bias voltage Vb2 is changed in each of the plurality of frames, even without adjusting the brightness of the external lighting device. Information about the light change sensing characteristic of the vision sensor may be obtained by obtaining the event data EDT in each of the plurality of frames. That is, the test device for testing the vision sensor may obtain information about the response probability according to the change in the change sensing time TS using the event data EDT output from the vision sensor in each of the plurality of frames and detect the characteristics of the vision sensor from the obtained information. For example, the test device may obtain a response time when the response probability is 50% from the information, and determine the performance and reliability of the vision sensor using the obtained response time.

In order to test a vision sensor, the vision sensor according to the comparative example directly adjusts a degree of change in the brightness of an external lighting device and directly controls a time at which the brightness of the external lighting device changes. Because a separate lighting device is required to test the vision sensor of the comparative example, the cost of a test operation increases, and additional time is required for the lighting device to output light of a desired brightness, which reduces the accuracy of the test. However, the vision sensor according to the inventive concept may obtain the light change detection characteristic of the vision sensor without a separate lighting device, and thus, the cost is reduced, and obtain the characteristic by changing an electrical signal, and thus, the accuracy of a characteristic test may increase.

Figures 9, 10:
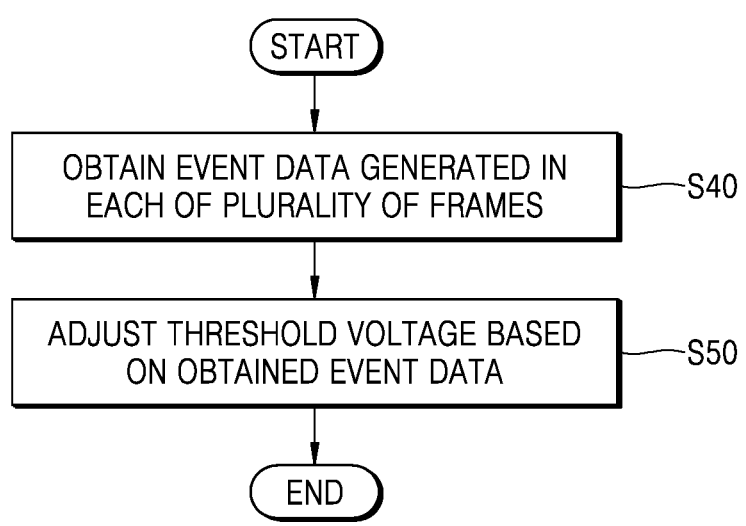
FIG. 9 is a table illustrating a bias control signal generated to adjust an output voltage in a vision sensor according to an embodiment.
FIG. 10 is a flowchart illustrating an operating method of a vision sensor according to an embodiment.

FIG. 9 is a table illustrating the bias control signal CS generated to adjust an output voltage in the vision sensor 100 according to an embodiment.

Referring to FIGS. 2, 3, and 9, a data value of the bias control signal CS provided to the bias generation circuit 120 may be preset in the bias control signal generation circuit 130. The bias control signal CS may include a first bias control signal CS1 and a second bias control signal CS2, and the first bias control signal CS1 may be a control signal for adjusting the first test bias voltage Vb1 provided to a current-voltage conversion circuit of the sensing circuit 111, and the second bias control signal CS2 may be a control signal for adjusting the second test bias voltage Vb2 provided to a source follower circuit of the sensing circuit 111.

In order to test the vision sensor 100, a level of the output voltage VOUT1 of the sensing circuit 111 may be adjusted. First to n-th data values D11 to D1n of the first bias control signal CS1 respectively corresponding to the first to nth levels V1 to Vn of the output voltage VOUT1 may be set, and first to n-th data values D21 to D2n of the second bias control signal CS2 may be set. When a test operation of testing the vision sensor 100 is performed, the bias generation circuit 120 may change the set data value of the first bias control signal CS1 or change the data value of the second bias control signal CS2. As the data value of at least one of the first bias control signal CS1 or the second bias control signal CS2 is changed, even though there is no change in the brightness of an external light of the vision sensor 100, the output voltage VOUT1 of the sensing circuit 111 of the pixel PX may be changed to a desired level.

FIG. 10 is a flowchart illustrating a method of operating a vision sensor according to an embodiment. In an embodiment, operations S40 and S50 of FIG. 10 may be performed after operation S30 of FIG. 6.

Referring to FIG. 10, in operation S40, the vision sensor may obtain event data generated in each of a plurality of frames. As described with reference to FIGS. 7, 8A, and 8B, the event data may be obtained while variously changing an amount of variation in which a level of an output voltage of a sensing circuit of a pixel varies in each of the plurality of frames, or the event data may be obtained while variously changing a level change time at which the level of the output voltage is changed in each of the plurality of frames. A characteristic of the vision sensor may be detected from the event data obtained in each of the plurality of frames.

In operation S50, the vision sensor may adjust threshold voltages (e.g., the on-threshold voltage VREF_ON and the off-threshold voltage VREF_OFF of FIG. 3) provided to each pixel based on the detected characteristic. The performance of detecting a change in light of the vision sensor may be improved by adjusting the threshold voltages according to the performance of a pixel array of the vision sensor.

Figure 11:
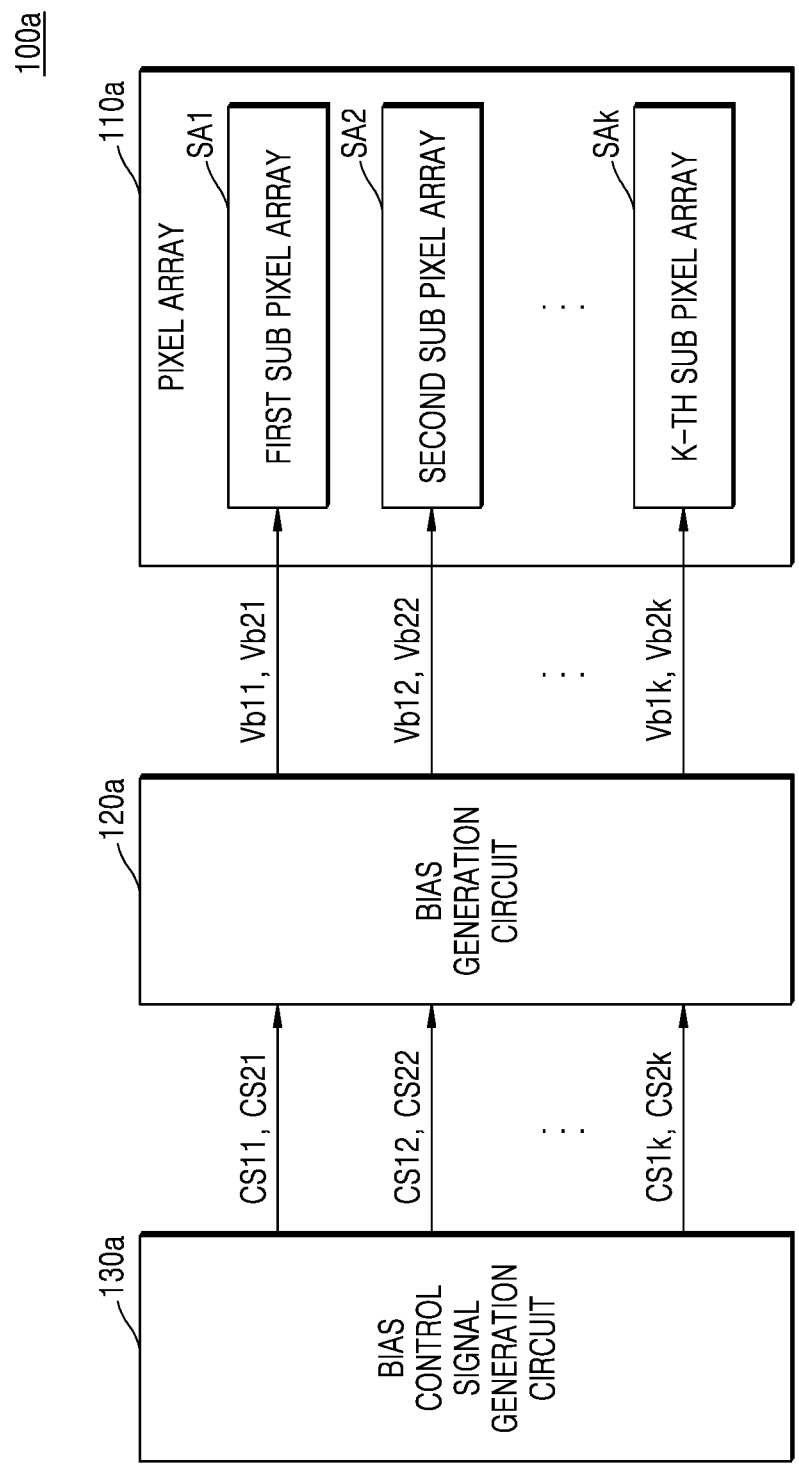
FIG. 11 is a block diagram illustrating a vision sensor according to an embodiment.

FIG. 11 is a block diagram illustrating a vision sensor 100a according to an embodiment.

Referring to FIG. 11, the vision sensor 100a may include a pixel array 110a, a bias generation circuit 120a, and a bias control signal generation circuit 130a. The vision sensor 100a may further include the event detection circuit 140 and the interface circuit 150 described with reference to FIG. 2.

The pixel array 110a may include a plurality of sub pixel arrays, for example, first to k-th sub pixel arrays SA1 to SAk. Each of the first to k-th sub pixel arrays SA1 to SAk may include a plurality of pixels PX arranged in the form of a matrix, and each of the first to k-th sub pixel arrays SA1 to SAk may include the different pixels PX. Each of the plurality of pixels PX may detect events in which the intensity of received light increases or decreases. K may be a natural number equal to or greater than 3, but is not limited thereto, and the pixel array 110a may include two sub arrays.

The bias generation circuit 120a may generate voltages to be provided to the pixel array 110a. The bias generation circuit 120a may generate a first test bias voltage Vb11 and a second test bias voltage Vb21 provided to the first sub pixel array SA1, generate a first test bias voltage Vb12 and a second test bias voltage Vb22 provided to the second sub pixel array SA2, and generate a first test bias voltage Vb1k and a second test bias voltage Vb2k provided to the k-th sub pixel array SAk.

The bias generation circuit 120a may change voltage levels of the first test bias voltage Vb11 and the second test bias voltage Vb21 to be provided to the first sub pixel array SA1 according to a first bias control signal CS11 and a second bias control signal CS21 received from the bias control signal generation circuit 130a. The bias generation circuit 120a may change voltage levels of the first test bias voltage Vb12 and the second test bias voltage Vb22 provided to the second sub pixel array SA2 according to a first bias control signal CS12 and a second bias control signal CS22 received from the bias control signal generation circuit 130a. Also, the bias generation circuit 120a may change voltage levels of the first test bias voltage Vb1k and the second test bias voltage Vb2k provided to the k-th sub pixel array SAk according to a first bias control signal CS1k and a second bias control signal CS2k received from the bias control signal generation circuit 130a.

Each of the first test bias voltages Vb11 to Vb1k may be provided to a current-voltage conversion circuit included in a sensing circuit of a pixel included in a corresponding sub array, thereby controlling an output of the current-voltage conversion circuit. Each of the second test bias voltages Vb21 to Vb2k may be provided to a source follower circuit included in a sensing circuit of pixels included in a corresponding sub array, thereby controlling an output of the source follower circuit.

Compared to the vision sensor 100 of FIG. 2, the vision sensor 100a of FIG. 11 may provide a test bias voltage to the pixel array 110a in units of sub arrays, and may test the characteristic of the vision sensor 100a individually in units of sub arrays.

Figure 12:
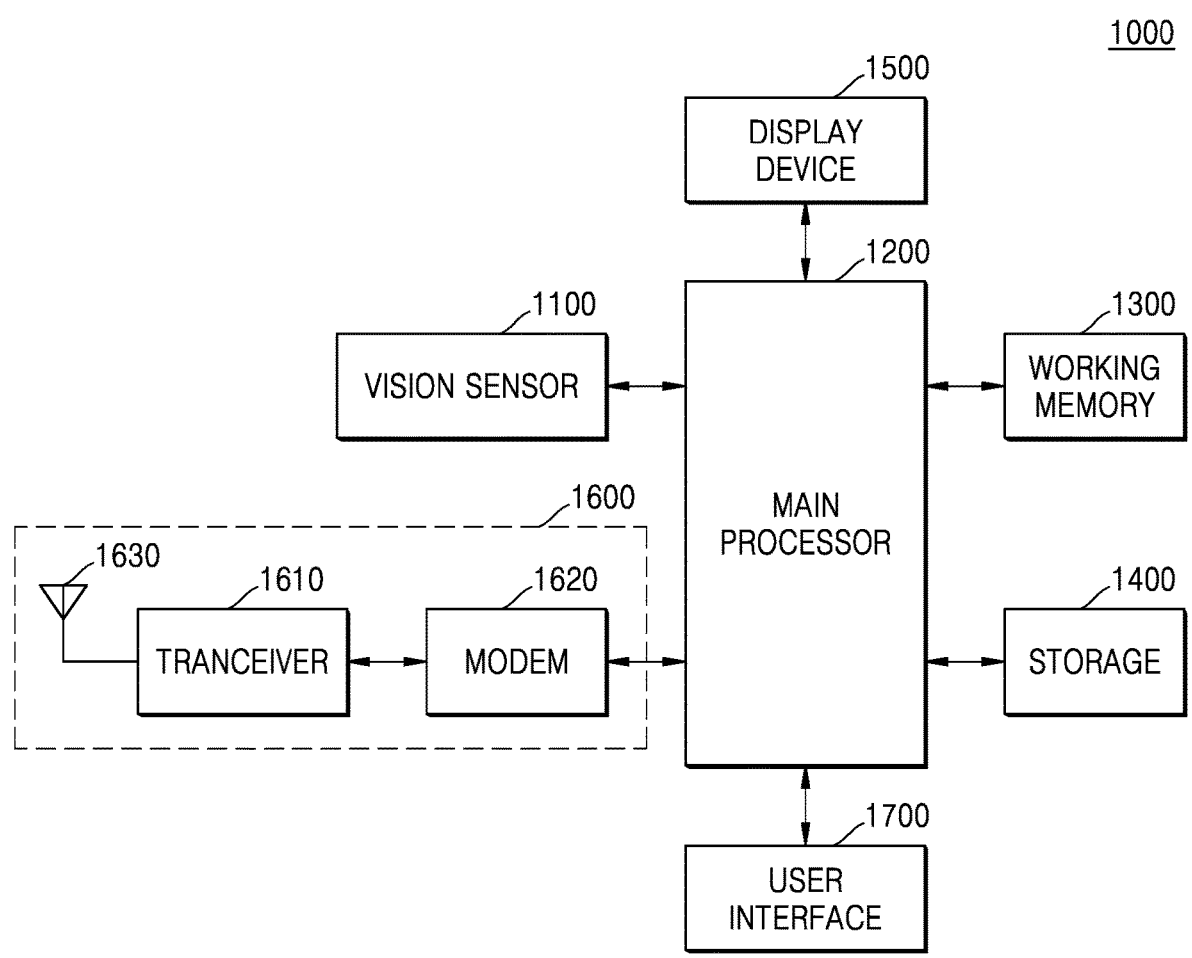
FIG. 12 is a block diagram illustrating an electronic device including a vision sensor according to an embodiment.

FIG. 12 is a block diagram illustrating an electronic device 1000 including a vision sensor 1100 according to an embodiment.

Referring to FIG. 12, the electronic device 1000 may include the vision sensor 1100, a main processor 1200, a working memory 1300, a storage 1400, a display device 1500, a communicator 1600, and a user interface 1700.

The vision sensor 1100 may sense an object to generate event data, and transmit the generated event data to the main processor 1200. The main processor 1200 may control the overall operation of the electronic device 1000, and process the event data received from the vision sensor 1100, e.g., event signals, to detect a movement of the object. The vision sensors 100 and 100a described with reference to FIGS. 1 to 11 may be applied as the vision sensor 1100. Accordingly, characteristics of a pixel array included in the vision sensor 1100 may be tested even though the vision sensor 1110 without a separate external lighting device for testing.

The working memory 1300 may store data used for the operation of the electronic device 1000. For example, the working memory 1300 may temporarily store packets or frames processed by the processor 1120. For example, the working memory 1300 may include a volatile memory such as dynamic RAM (DRAM), synchronous RAM (SDRAM), and/or a nonvolatile memory such as phase-change RAM (PRAM), magneto-resistive RAM (MRAM), resistive RAM (ReRAM), and ferro-electric RAM (FRAM).

The storage 1400 may store data that is requested to store from the main processor 1200 or other components. The storage 1400 may include a nonvolatile memory such as flash memory, PRAM, MRAM, ReRAM, and FRAM.

The display device 1500 may include a display panel, a display driving circuit, and a display serial interface (DSI). For example, the display panel may be implemented as various devices such as a liquid crystal display (LCD) device, a light emitting diode (LED) display device, an organic LED (OLED) display device, an active matrix OLED (AMOLED) display device, etc. The display driving circuit may include a timing controller, a source driver, etc. necessary for driving the display panel. A DSI host embedded in the main processor 1200 may perform serial communication with the display panel through the DSI.

The communicator 1600 may exchange signals with an external device/system through an antenna 1630. A transceiver 1610 and a modulator/demodulator (MODEM) 1620 of the communicator 1600 may process signals exchanged with the external device/system according to a wireless communication protocol such as long term evolution (LTE), worldwide interoperability for microwave access (WIMAX), global system for mobile communication (GSM), code division multiple access (CDMA), Bluetooth, near field communication (NFC), wireless fidelity (Wi-Fi), or radio frequency identification (RFID).

The user interface 1700 may include at least one of input interfaces such as a keyboard, a mouse, a keypad, a button, a touch panel, a touch screen, a touch pad, a touch ball, a gyroscope sensor, a vibration sensor, or an acceleration sensor.

Components of the electronic device 1000, for example, the vision sensor 1100, the main processor 1200, the working memory 1300, the storage 1400, the display device 1500, the communicator 1600, and the user interface 1700, may exchange data based on one or more of various interface protocols such as universal serial bus (USB), small computer system interface (SCSI), MIPI, I2C, peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), non-volatile memory express (NVMe), and universal flash storage (UFS).

While some of the inventive concepts have been particularly shown and described with reference to embodiments thereof, it will be understood that various changes in form and details may be made therein without departing from the spirit and scope of the following claims.

What is claimed is:

1. A vision sensor comprising:
    a pixel array comprising a plurality of pixels comprising a first pixel; wherein the first pixel comprises a sensing circuit configured to generate a first output voltage based on an internal voltage generated based on changes in intensity of light, and generate a second output voltage based on a first test bias voltage received from a bias voltage generation circuit, and wherein the sensing circuit comprises:
        a photoelectric conversion element configured to generate a photocurrent based on the changes in the intensity of the light;
        a current-voltage conversion circuit comprising a first transistor connected to the photoelectric conversion element, the current-voltage conversion circuit configured to convert the photocurrent into the internal voltage; and
        a source-follower configured to convert the internal voltage to the first output voltage,
    wherein the first transistor is configured to receive the first test bias voltage, and
    wherein the photocurrent flows through the first transistor.

2. The vision sensor of claim 1, wherein the sensing circuit is configured to generate a third output voltage based on a second test bias voltage received from the bias voltage generation circuit, and
    wherein a magnitude of the first test bias voltage is different from a magnitude of the second test bias voltage.

3. The vision sensor of claim 2, wherein the sensing circuit is configured to control the first output voltage based on the second test bias voltage.

4. The vision sensor of claim 2, wherein the vision sensor comprises the bias voltage generation circuit and the bias voltage generation circuit configured to generate a bias control signal for controlling a magnitude of a bias voltage comprising the first and second test bias voltages.

5. The vision sensor of claim 2, wherein each of the plurality of pixels in the pixel array is configured to receive a same test bias voltage.

6. The vision sensor of claim 2, wherein the vision sensor is configured to generate event data based on the first output voltage and selectively transmit the event data to a processor.

7. The vision sensor of claim 6, wherein the vision sensor is configured to aperiodically transmit the event data to the processor.

8. The vision sensor of claim 6, wherein the vision sensor is configured to periodically transmit the event data to the processor.

9. The vision sensor of claim 7, wherein the vision sensor and the processor are implemented as separate chips.

10. The vision sensor of claim 7, wherein the vision sensor and the processor are implemented as a single chip.

11. The vision sensor of claim 7, wherein the first transistor is a p-type transistor.

12. A vision sensor comprising:
    a pixel array comprising a plurality of pixels comprising a first pixel, the first pixel comprising a sensing circuit configured to sense changes in intensity of light and generate a first output voltage aperiodically based on an internal voltage generated based on the changes in the intensity of the light,
    wherein the sensing circuit is configured to receive a test bias voltage from a voltage generation circuit and control the internal voltage based on the test bias voltage,
    wherein the sensing circuit comprises a p-type transistor configured to receive a first test voltage and a n-type transistor configured to receive a second test voltage different from the first test voltage.

13. The vision sensor of claim 12, wherein a level of the first output voltage stays constant even when the intensity of the light changes.

14. The vision sensor of claim 12, wherein the vision sensor further comprise an interface configured to pack event signals generated based on the changes in the intensity of the light.

15. The vision sensor of claim 14, wherein the interface comprises one of an address event representation interface, a mobile industry processor interface, and a parallel interface.

16. The vision sensor of claim 15, wherein the interface is configured to periodically transmit the event signals to a processor.

17. The vision sensor of claim 15, wherein the interface is configured to aperiodically transmit the event signals to a processor.

* * * * *